(12) United States Patent
Song et al.

(10) Patent No.: US 6,496,754 B2
(45) Date of Patent: Dec. 17, 2002

(54) MOBILE ROBOT AND COURSE ADJUSTING METHOD THEREOF

(75) Inventors: Jeong-gon Song, Kwangju (KR);
Sang-yong Lee, Kwangju (KR);
Seung-bin Moon, Suwon (KR);
Kyoung-mu Lee, Seoul (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 0 days.

(21) Appl. No.: 09/879,361

(22) Filed: Jun. 11, 2001

(65) Prior Publication Data

US 2002/0091466 A1 Jul. 11, 2002

(30) Foreign Application Priority Data

Nov. 17, 2000 (KR) .......................................... 2000-68445
Nov. 17, 2000 (KR) .......................................... 2000-68446
Nov. 22, 2000 (KR) .......................................... 2000-69621

(51) Int. Cl.[7] .............................................. G06F 19/00
(52) U.S. Cl. ....................... 700/245; 700/145; 700/165; 700/169; 700/179; 700/206; 700/250; 701/23; 701/24; 701/25; 318/568.12; 318/587
(58) Field of Search ................................ 700/245, 145, 700/165, 182, 169, 179, 180, 206, 83, 97, 250; 701/24, 23, 25; 15/327.1, 350, 352, 353, 459.1, 387, 375, 383, 335, 319; 180/167, 211; 318/587, 568.12; 340/436

(56) References Cited

U.S. PATENT DOCUMENTS

| | | | | |
|---|---|---|---|---|
| 4,674,048 A | * | 6/1987 | Okumura | 180/211 |
| 5,051,906 A | * | 9/1991 | Evans et al. | 180/169 |
| 5,109,566 A | * | 5/1992 | Kobayashi et al. | 318/568.12 |
| 5,377,106 A | * | 12/1994 | Drunk et al. | 706/13 |
| 5,787,545 A | * | 8/1998 | Colens | 340/436 |
| 5,793,934 A | * | 8/1998 | Bauer | 250/253 |

(List continued on next page.)

FOREIGN PATENT DOCUMENTS

| | | |
|---|---|---|
| EP | 0363339 | 10/1989 |
| GB | 2277152 | 10/1994 |
| GB | 2286696 | 2/1995 |
| GB | 2353909 | 3/2001 |
| JP | 0089213 | 5/1985 |
| JP | 1243104 | 9/1989 |
| JP | 0020934 | 1/1998 |
| JP | 0177414 | 6/1998 |

OTHER PUBLICATIONS

Gomes et al., Vaccum cleaning robot, 1995, Internet, pp. 1–1–14.*

Indoor Environmental Solution, Inc., Deluxe cleaning robot, 1998, Internet, pp. 1–14.*

(List continued on next page.)

Primary Examiner—William A. Cuchlinski, Jr.
Assistant Examiner—McDieunel Marc
(74) Attorney, Agent, or Firm—Ladas & Parry

(57) ABSTRACT

A mobile robot capable of recognizing its location and adjusting its direction in response to an obstacle in its way includes a running device, an obstacle detecting device for detecting the presence of an obstacle, a location recognizing device, a controlling portion, and a power supply. The location recognizing device includes a first vision camera directed toward the ceiling of a room and a first vision board. The first vision camera recognizes a base mark on the ceiling. The first vision board processes an image from the first vision camera and transmits the image data to the controlling portion. The obstacle detecting device includes a line laser for emitting a linear light beam toward the obstacle, a second vision camera for recognizing a reflective linear light beam from the obstacle, and a second vision board for processing image data captured by the second vision camera.

8 Claims, 9 Drawing Sheets

U.S. PATENT DOCUMENTS

| | | | | |
|---|---|---|---|---|
| 5,896,618 A | * | 4/1999 | Woo et al. | 15/324 |
| 5,940,930 A | * | 8/1999 | Oh et al. | 15/319 |
| 5,995,884 A | * | 11/1999 | Allen et al. | 180/167 |
| 6,058,561 A | * | 5/2000 | Song et al. | 15/375 |
| 6,076,025 A | * | 6/2000 | Ueno et al. | 701/23 |
| 6,119,057 A | * | 9/2000 | Kawagoe | 15/319 |
| 6,195,835 B1 | * | 3/2001 | Song et al. | 15/327.1 |
| 6,338,013 B1 | * | 1/2002 | Ruffner | 180/167 |

OTHER PUBLICATIONS

Hinkel et al., An application for a distributed computer architecture —Realtime data processing in an autonomous mobile robot, 1998, Distributed Computing Systems, The compuer Society/IEEE, pp. 1–9.*

IEEE ICIP'S '98—Proceedings of the second IEEE International Conference on Intelligent Processing Systems, 4–7, Aug. 1998—pp. 594–598: Verma B et al.—Behavior integration for landmark tracking and real–time obstacle avoidance.

IEEE DMC 99'Proceedings of the 1999 IEEEE International Conference on systems, Man and Cybernetics, Oct. 12–15, 1999, pp. 731–741.

* cited by examiner

MOBILE ROBOT AND COURSE ADJUSTING METHOD THEREOF

BACKGROUND OF THE INVENTION

1. Field of the Invention

The present invention relates to a mobile robot, which automatically moves about a room, and more particularly, to a mobile robot having a vision camera to recognize its location and to avoid collision with obstacles in the room. The present invention also relates to a course adjusting method for the mobile robot.

2. Description of the Related Art

Generally, a mobile robot has a power source and a sensor mounted in its body, and thus can automatically run about a given area without an external power supply or manipulation. There are two main types of mobile robots that are used inside a house: robots that clean the rooms of the house; and robots that guard the house from possible intruders.

The conventional mobile robot uses a random motion method, by which the mobile robot moves in a random direction without recognizing its location, repeatedly shifting its direction whenever it encounters obstacles, such as a wall, table, etc.

Such a conventional mobile robot includes a running device for moving the mobile robot about a room, an obstacle detecting device for detecting the presence of an obstacle, such as a wall, table, etc., a controlling portion for adjusting an orientation of the mobile robot by controlling the running device and the obstacle detecting device, and a power supply for storing and supplying the power to the respective devices.

The running device can be a wheel-type device that employs a servo-motor or stepping motor to rotate a plurality of wheels and move the mobile robot, a caterpillar-type device that uses an endless track, or a joint-type device that uses a plurality of legs. Among these types of devices, the wheel-type running device is most widely used.

The obstacle detecting device detects obstacles, such as a wall, table, etc., with an ultrasonic sensor or laser sensor, and sends out a corresponding signal to the controlling portion. The sensor of the obstacle detecting device is preferably mounted on a front side of the mobile robot in parallel with a running surface, so as to detect more accurately the obstacle located in the running path.

The controlling portion includes a microprocessor and memory mounted thereon for controlling general operations of the mobile robot, such as sending out a start command to the running device, controlling movement of the running device to avoid an obstacle in accordance with the signals received from the obstacle detecting device and an internal, prefurnished program, and charging the power supply with electricity when it determines that the power level is below a predetermined value.

The power supply supplies power for operating various parts of the mobile robot, such as the motor, which rotates the wheels of the running device, the sensor, which detects the presence of any obstacles, and the control portion, etc. The power supply usually is a storage battery, enabling the mobile robot to operate for a predetermined period of time without connection to an external power source.

The operation of the mobile robot constructed as above will be described in detail below.

First, when the mobile robot receives a start command, the controlling portion sends out a running command and corresponding sensing signal to the running device and the obstacle detecting device, respectively. In response to the signal from the controlling portion, the running device runs in a certain direction by driving the motor. At this time, by operating the sensor, the obstacle detecting device sends out a sensing signal to the controlling portion. During operation of the mobile robot, when the sensor senses the presence of an obstacle within a predetermined distance range of the robot, the controlling portion sends out a command to the running device to shift the path or running direction of the mobile robot. Then the running device resumes running of the mobile robot. Whenever the mobile robot encounters an obstacle, the running direction of the mobile robot is altered by the processes described above. That is, the mobile robot runs according to its initial position and the locations of the obstacles, drawing a random track as shown in FIG. 1.

Such a random motion mobile robot is found to be inefficient when running in a limited area, since it runs on a random track. Another drawback of the random motion mobile robot is that it repeatedly travels across the same area.

The ultrasonic sensor of the conventional obstacle detecting device includes an ultrasonic emitting portion for emitting ultrasound waves, and an ultrasonic receiving portion for receiving reflective ultrasound waves from the obstacle. By measuring a time gap between ultrasound emission and reflective ultrasound receipt, the controlling portion calculates a distance from the mobile robot to the obstacle, and accordingly controls the motor of the mobile robot to avoid the obstacle.

Although the conventional obstacle detecting device and method thereof can measure the distance from the mobile robot to the obstacle, the same cannot properly deal with the obstacles according to the status of the obstacle, since it is impossible to obtain precise information about the status of the obstacle, such as the shape of the obstacle, or the like. Accordingly, it is impossible for the mobile robot to determine whether to pass or avoid the obstacle.

The mobile robot is required to keep a predetermined orientation in order to perform a cleaning or guarding operation more efficiently. For this, it is necessary to periodically check whether the mobile robot is running along the right course and to adjust the orientation of the mobile robot, if it is determined that the mobile robot has deviated off course.

In order to ensure that the mobile robot runs on the right course, the conventional mobile robot uses a guide tape or a wall of a room as a reference.

When using the guide tape, which is attached to the floor, the mobile robot checks for the guide tape by using a photo-sensor or a magnetic sensor. The mobile robot runs along the guide tape. The relative location of the guide tape with respect to the sensor determines whether the mobile robot is on the right course or not.

When using the wall of the room as a reference, whether the mobile robot moves along the right course or not is determined according to the distance of the mobile robot from the wall, as detected by a sensor, such as ultrasonic sensor, etc. Depending on the distance between the mobile robot and the wall, the mobile robot will adjust its orientation.

While these ways to adjust the course of the mobile robot, i.e., using the guide tape or wall as a reference, can be useful when controlling the running of the mobile robot, they are hardly applicable to a mobile robot that recognizes its location using a vision camera. That is, separately providing the guide tape or the ultrasonic sensor to the mobile robot that recognizes its location by vision camera, just to determine whether to adjust the orientation of the mobile robot or not, causes disadvantages, such as complicating manufacturing processes and increasing manufacturing costs.

SUMMARY OF THE INVENTION

The present invention has been made to overcome the above-mentioned problems of the related art. Accordingly, it is an object of the present invention to provide a mobile robot capable of efficiently running along a certain course while recognizing its location and avoiding repeat passes in the same area.

Another object of the present invention is to provide a mobile robot capable of determining whether to pass or avoid an obstacle in a running direction, based on information about a shape of the obstacle. Information on the obstacle's shape is provided by an obstacle detecting device having a line laser and a vision camera.

Yet another object of the present invention is to provide a method for adjusting an orientation of the mobile robot, which recognizes its location by using a vision camera, according to a determination as to whether to maintain or shift the path.

The above objects are accomplished by a mobile robot according to the present invention. The mobile robot includes a running device for moving the mobile robot about a room, an obstacle detecting device for detecting a presence of an obstacle, a location recognizing device for recognizing a current location of the mobile robot, a controlling portion for controlling the running device, the obstacle detecting device and the location recognizing device, and a power supply for storing and supplying electricity to each of the devices and the controlling portion. The location recognizing device includes a first vision camera facing a ceiling of the room. The first vision camera recognizes a base mark on the ceiling. The location recognizing device further includes a first vision board for processing an image photographed by the first vision camera into data and transmitting the data to the controlling portion.

The obstacle detecting device includes a line laser for emitting a linear light beam toward the obstacle, a second vision camera for recognizing a reflective linear light beam from the obstacle, and a second vision board for processing image data captured by the second vision camera.

Further, the above objects are also accomplished by a mobile robot according to the present invention, including a running device for moving the mobile robot in a room, an obstacle detecting device for detecting a presence of an obstacle, a location recognizing device for recognizing a current location of the mobile robot, a controlling portion for controlling the running device, the obstacle detecting device and the location recognizing device, and a power supply for storing and supplying electricity to the running device, the obstacle detecting device, the location recognizing device and the controlling portion. The obstacle detecting device includes a line laser for emitting a linear light beam toward the obstacle, a second vision camera for recognizing a reflective linear light beam from the obstacle, and a second vision board for processing image data captured by the second vision camera.

The second vision camera includes a filter for exclusively recognizing the linear light beam from the line laser.

Further, the above objects are also accomplished by a method for adjusting a course or running route of a mobile robot. The mobile robot includes a running device for moving the mobile robot about a room, an obstacle detecting device for detecting a presence of an obstacle, a location recognizing device for recognizing a current location of the mobile robot, a controlling portion for controlling the running device, the obstacle detecting device and the location recognizing device, and a power supply for storing and supplying electricity to each of the devices and the controlling portion. The method includes photographing a base mark using a first vision camera of the location recognizing device and generating image data of the base mark using a first vision board, determining whether coordinates of the base mark, which are obtained by data processing of the controlling portion, match coordinates of a predetermined moving route, and controlling the running device to move the mobile robot in a direction by a corresponding distance to compensate for any deviation from the predetermined moving route, when the coordinates of the base mark do not match the coordinates of the predetermined moving route.

The mobile robot according to another preferred embodiment of the present invention further includes a vacuum cleaner which has a suction port for sucking in contaminants, a dust collecting portion for collecting the contaminants therein, and a motor driving portion for generating a suction force.

BRIEF DESCRIPTION OF THE DRAWINGS

The above and other objects and advantages of the present invention will become readily apparent by reference to the following detailed description when considered in conjunction with the accompanying drawings, in which.

DETAILED DESCRIPTION OF THE PREFERRED EMBODIMENT

The preferred embodiment of the present invention will be described below with reference to the accompanying drawings.

Figure 1:
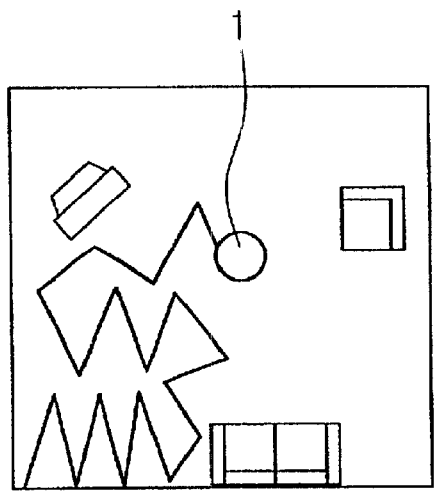
FIG. 1 is a view showing a movement track of a conventional mobile robot.
Figure 2:
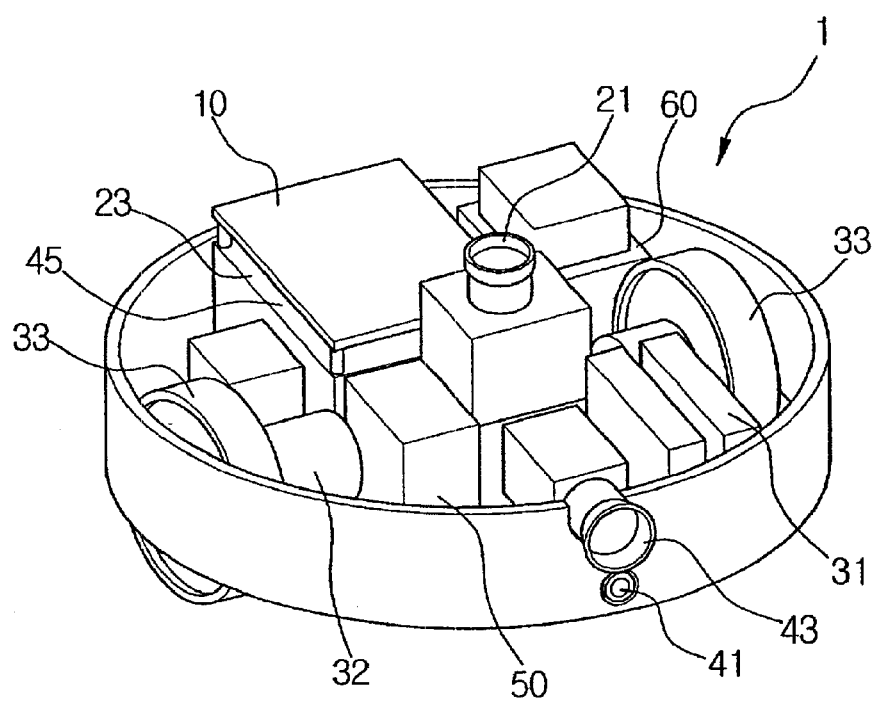
FIG. 2 is a schematic perspective view showing a structure of a mobile robot, in accordance with a preferred embodiment of the present invention.
Figure 3:
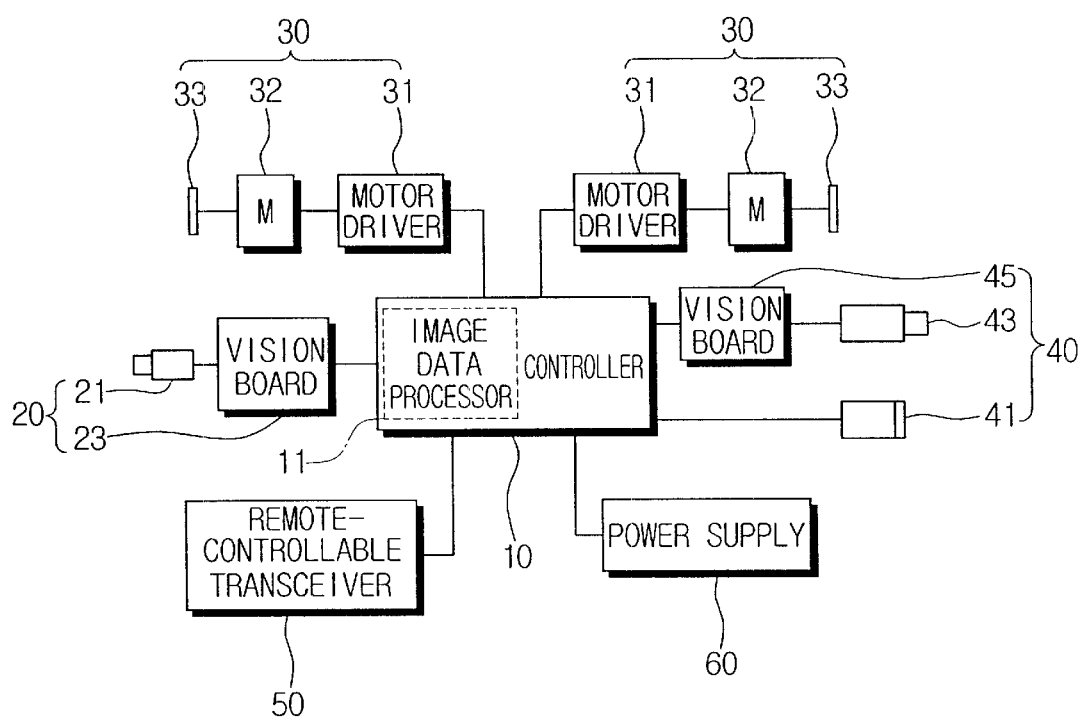
FIG. 3 is a block diagram showing the functions of respective parts of the mobile robot of the present invention.

Referring first to FIGS. 2 and 3, a mobile robot 1 includes a running device 30 for moving the mobile robot 1 along a planar surface, a location recognizing device 20 for recognizing a location of the mobile robot 1 by using a first vision camera (CCD camera 21), an obstacle detecting device 40 for detecting the presence of an obstacle in the path of the mobile robot 1, a remote-controllable transceiver 50 for transmitting or receiving a start/stop command to/from the mobile robot 1, and a power supply 60 for storing and supplying power to the respective components of the mobile robot 1.

The running device 30 includes a pair of wheels 33, which are capable of moving forward and backward and left and right, a motor 32 for driving the wheels 33, and a motor driver 31 for controlling the motor 32 in response to signals that the motor driver 31 receives from the controlling portion 10.

The location recognizing device 20 includes a first vision camera 21 vertically disposed to image a ceiling on which a base mark 70 (FIG. 5) is attached. The location recognizing device 20 further includes a first vision board 23 for setting relevant thresholds with images photographed by the first vision camera 21.

The obstacle detecting device 40 includes a line laser 41 for emitting a linear beam of light in the path or running direction of the mobile robot 1, a second vision camera 43 for recognizing a linear beam of light reflected from an obstacle located in the path of the mobile robot 1, and a second vision board 45 for processing the images photographed by the second vision camera 43.

The line laser 41 is often called a "line-emitter," since it emits a beam in the form of straight line on an image plane. The image plane is perpendicular to an optical axis of the line laser 41. The line laser 41 is mounted on a front side of the mobile robot 1 and detects the presence of any obstacle which may be located in the robot's path.

The second vision camera 43 is mounted above the line laser 41 to capture any linear beam of the line laser 41 that is reflected from an obstacle. The second vision camera 43 includes a filter attached thereto, to exclusively recognize a reflective beam of the line laser 41. The filter also exclusively passes a wavelength that corresponds to the linear beam from the line laser 41, thereby permitting the second vision camera 43 to exclusively recognize the linear beam from the line laser 41.

The second vision board 45 is mounted on one side of the second vision camera 43 and connected via wires to the controlling portion 10 and the second vision camera 43.

The remote-controllable transceiver 50 enables a user to control the starting and stopping of the mobile robot from a remote location. That is, the remote-controllable transceiver 50 receives a start or stop command from the user and transmits a status signal of the mobile robot 1 to the user.

The power supply 60 is a power storage battery, which stores and supplies a predetermined level of electricity to the respective components of the mobile robot 1.

For an overall control of the mobile robot 1, the controlling portion 10 is connected to the motor driver 31 of the running device 30, the location recognizing device 20, the obstacle detecting device 40, the remote-controllable transceiver 50, and the power supply 60. The controlling portion 10 includes an image data processor 11, which has a microprocessor for calculating a positional data with image data transmitted from the first and second vision boards 23 and 45. That is, the controlling portion 10 uses its own location information and the position and shape information of an obstacle to set a target point and a running course for the mobile robot 1. The controlling portion 10 further directs the mobile robot 1 along the right course to the target point. The mobile robot's location information is obtained by using the image data of the base mark 70, which is obtained by photographing with the first vision camera 21 the ceiling on which the base mark 70 is attached and processing the photographed image with the first vision board 23. The position and shape of the obstacle are obtained using linear image data, which is obtained by photographing with the second vision camera 43 of the obstacle detecting device 40 the obstacle and processing the photographed image with the second vision board 45.

The operation of the mobile robot 1 constructed above will be described in greater detail below.

Figure 4:
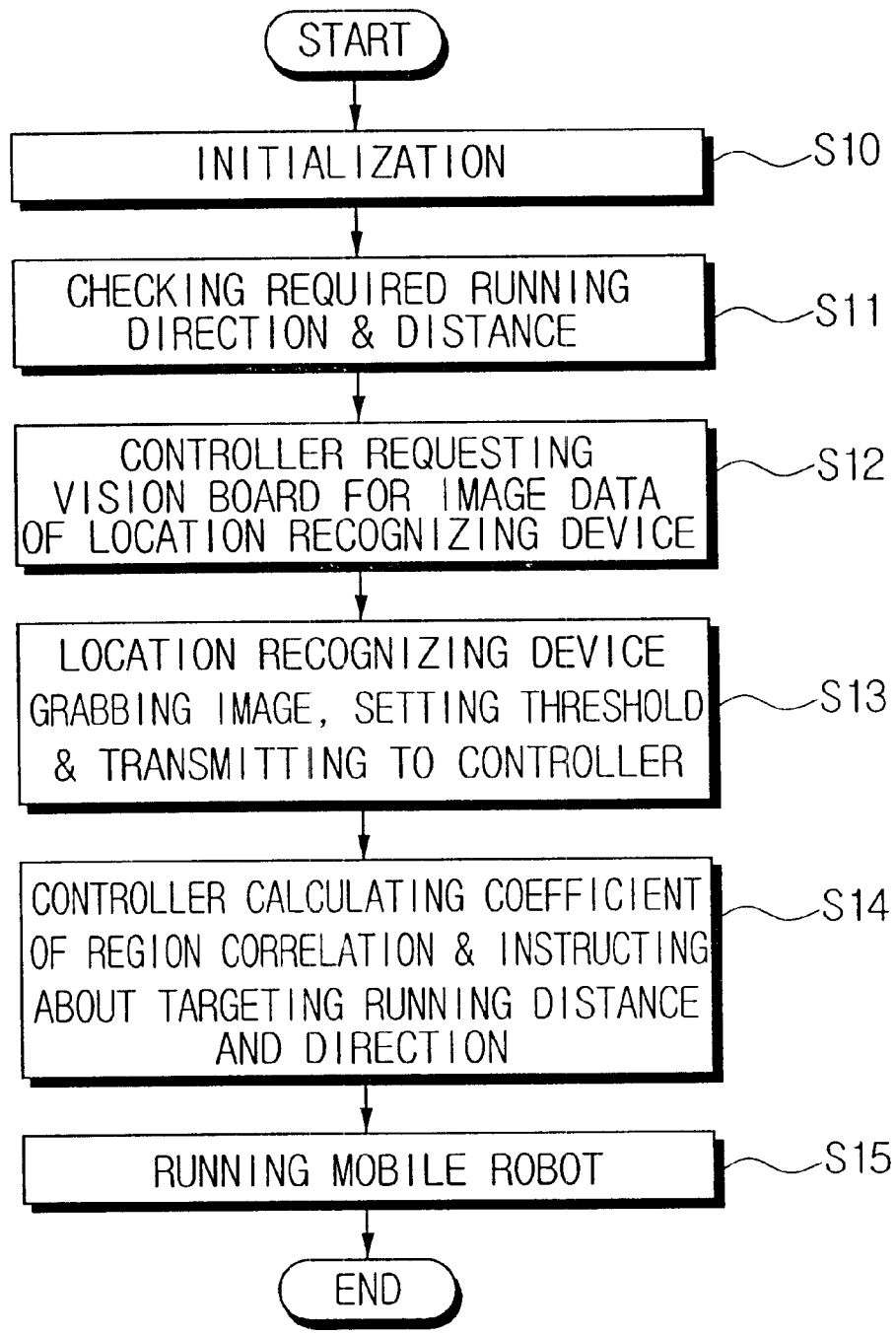
FIG. 4 is a flow chart explaining a method for recognizing a location of the mobile robot of the present invention.

The running process and location recognizing process of the mobile robot 1 through the first vision camera 21 will be described with reference to FIG. 4.

Figure 5:
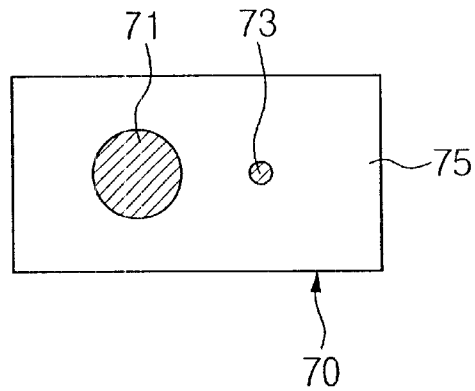
FIG. 5 is a view of one example of a base mark for the mobile robot of the present invention.

First, when the mobile robot 1 receives a start command, the controlling portion 10 initializes and checks a predetermined direction and distance (steps S10 and S11). When there is no data about the predetermined direction and distance, the controlling portion 10 requests image data from the location recognizing device 20 (step S12). Upon receipt of the request for image data from the controlling portion 10, the location recognizing device 20 uses the first vision camera 21 to photograph the ceiling from the current location of the mobile robot 1. Based on the image photographed by the first vision camera 21, the relevant threshold is set and transmitted to the image data processor 11 of the controlling portion 10 (step S13). Upon receipt of the image data from the first vision board 23, the image data processor 11 detects the location and direction of recognition dots 71 and 73 (FIG. 5) of the base mark 70 by a region correlation, and outputs a distance and direction that the running device 30 has to move (step S14). The base mark 70, which is attached to the ceiling, can be formed of any proper material, so long as it is recognizable by the first vision camera 21. It is preferable to use recognition marks for clearer recognition. One example of the base mark 70 is shown in FIG. 5. The base mark 70 is a recognition mark which includes a plate 75, a larger reference dot 71 and a smaller reference dot 73. The larger reference dot 71 is for determining the base location, while the smaller reference dot 73 is for checking a direction of the mobile robot 1 based on its relation with the bigger reference dot 71.

The controlling portion 10 transmits data about moving distance and direction from the image data processor 11 to the running device 30, and the running device 30 operates in the direction and distance determined by the signal from the controlling portion 10 (step S15).

The process of searching the recognition dots 71 and 73 through a region correlation of the threshold of the image data will be described in greater detail below.

Figure 6:
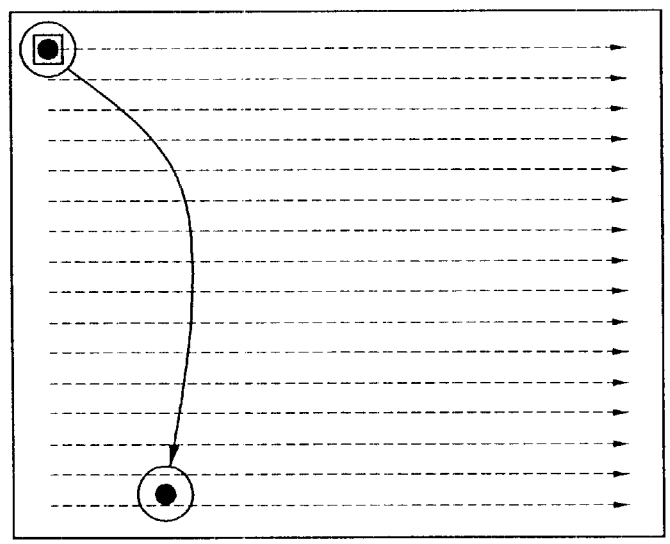
FIG. 6 is a view showing a moving track of the mobile robot which is moved according to a mask image set by a teaching process.

Region correlation is a process of comparing the mask image data of the base mark 70 with the image data obtained from the image of the ceiling photographed from a certain distance, and finding out a position indicating a similar mask image on an image window which is obtained by the first vision camera 21. As shown in an arrow in FIG. 6, teaching operation of the mask image of the base mark 70 is performed in a downward orientation.

Further, the location having a similar mask image with that of the mobile robot 1 is as follows. First, region correlation coefficients of the mask image, which is a result of the teaching operation, are obtained from the whole area of the image data of the image as photographed from a certain distance. Then, the area having the greatest correlation coefficient is selected, since it has the most similar image to the image of the recognition marks 73 and 75 of the base mark 70 that the mobile robot 1 is targeting. The location of the base mark 70 is expressed by the image photographed by the first vision camera 21 and formed on the image window (W) in pixel coordinates. Accordingly, by using the original coordinates of the base mark 70 and the coordinates of the base mark 70 on the current image window (W), the current location and direction of the mobile robot 1 are obtained. Further, since the location of the base mark 70 is obtained in the pixel coordinates, in every sampling period during which the ceiling is photographed by the first vision camera 21, the movement and path of the mobile robot 1 are also obtained.

The region correlation coefficient is expressed by $$r(d_x, d_y) = \frac{\sum_{(x,y)\in S}[f_1(x,y)-\overline{f}_1][f_2(x+d_x, y+d_y)-\overline{f}_2]}{\left\{\sum_{(x,y)\in S}([f_1(x,y)-\overline{f}_1])^2 \sum_{(x,y)\in S}([f_2(x+d_x, y+d_y)-\overline{f}_2])^2\right\}^{1/2}}$$

where $r(d_x, d_y)$ is a region correlation coefficient, $f_1$, is a teaching mask image, $\overline{f}_1$, is an average value of teaching mask image, $\overline{f}_2$ is an average value of $f_2$, $(d_x, d_y)$ is required a moving distance of the mask image in coordinates, (x, y) is a coordinate, and S is an original image.

Figure 7:
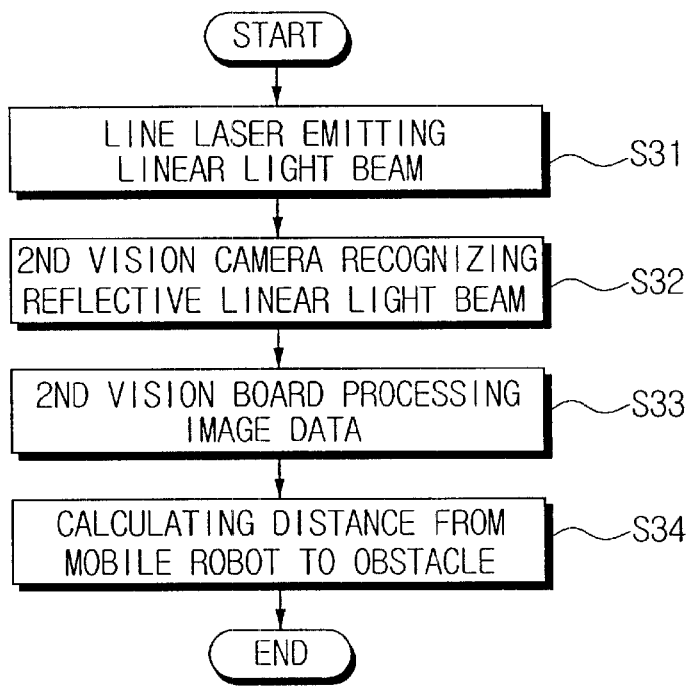
FIG. 7 is a flow chart explaining a method for detecting an obstacle using an obstacle detecting device in the mobile robot of the present invention.

Next, a method for detecting the presence of an obstacle while running will be described with respect to FIG. 7.

The obstacle detecting method includes the steps of: directing the line laser 41 to emit a linear beam toward an obstacle located in the mobile robot's path (step S31); having the second vision camera 43 recognize the reflective linear beam from the obstacle (step S32); having the second vision board 45 process the image from the second vision camera 43 into image data calculable using software (step S33); and calculating a distance from the mobile robot 1 to the obstacle by using the image data (step S34).

In the light emitting step (S31), when the line laser 41 directs a linear beam at an obstacle, the shape of the obstacle distorts the beam. In the recognizing step (S32), the second vision camera 43 forms an image by recognizing the reflective distorted beam from the filter. In the image data processing step (S33), the second vision board 45 performs the thresholding process in order to simplify the image recognized in the recognizing step (S32) and using a thinning process reduces the size of the image to as small as possible. In the distance calculating step (S34), the distance from the mobile robot 1 to the obstacle is calculated based on the image data obtained from the image data processing step (S43). The mobile robot 1 repeats the above-mentioned obstacle detecting processes until it obtains all of the information on the obstacle in its path.

Figure 8:
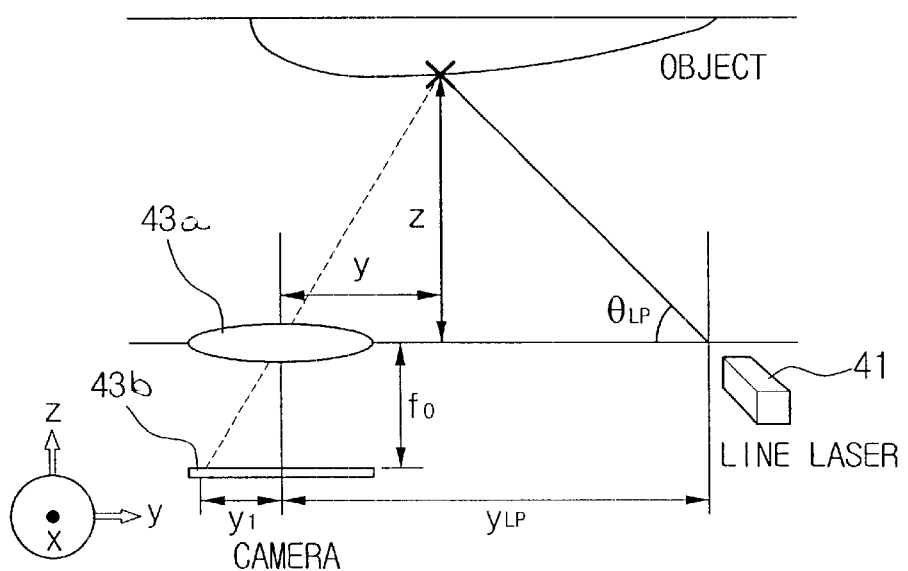
FIG. 8 is a view explaining a process of calculating a distance from the mobile robot to an obstacle.

Here, the distance from the mobile robot 1 to the obstacle can be easily obtained with a few values by trigonometry. As shown in FIG. 8, those values are: an angle ($\theta_{LP}$) between the line laser 41 and the mobile robot 1, distance ($y_{LP}$) between the vision camera 43 and the line laser 41, distance ($f_0$) between a lens 43*a* of the vision camera 43 and an image plane 43*b* on which the image of the obstacle is formed, and distance ($y_1$) from the image plane 43*b* to a center of the lens 43*a*. With these values, the distance (Z) from the mobile robot 1 to the obstacle is obtained by the trigonometric equation (refer to FIG. 8):

$$\frac{Z}{y_{LP} - y} = \tan\theta_{LP},$$

rearrange $$\frac{Z}{y_{LP} - y} = \tan\theta_{LP},$$

by substituting $x_0 = y_{LP} \cdot \tan\theta_{LP}$ and $y = -(Z \cdot y_1)/f_0$, and obtain $$Z = \frac{x_0}{1 - (y_1/f_0 \cdot \tan\theta_{LP})}$$

Since the angle ($\theta_{LP}$) between the line laser 41 and the mobile robot 1, the distance ($f_0$) between the lens 43*a* of the vision camera 43 and the obstacle image plane 43*b*, and the value of the $$x_0 = y_{LP} \cdot \tan\theta_{LP}$$

are all expressed in the constants, the distance (Z) from the mobile robot 1 to the obstacle can be obtained only by obtaining a value ($y_1$) corresponding to a horizontal distance from a center of the lens 43*a* to an end of the image data of the image formed on the image plane.

By solving the above equations with the image data, the shape of the obstacle can be determined.

Figure 9:
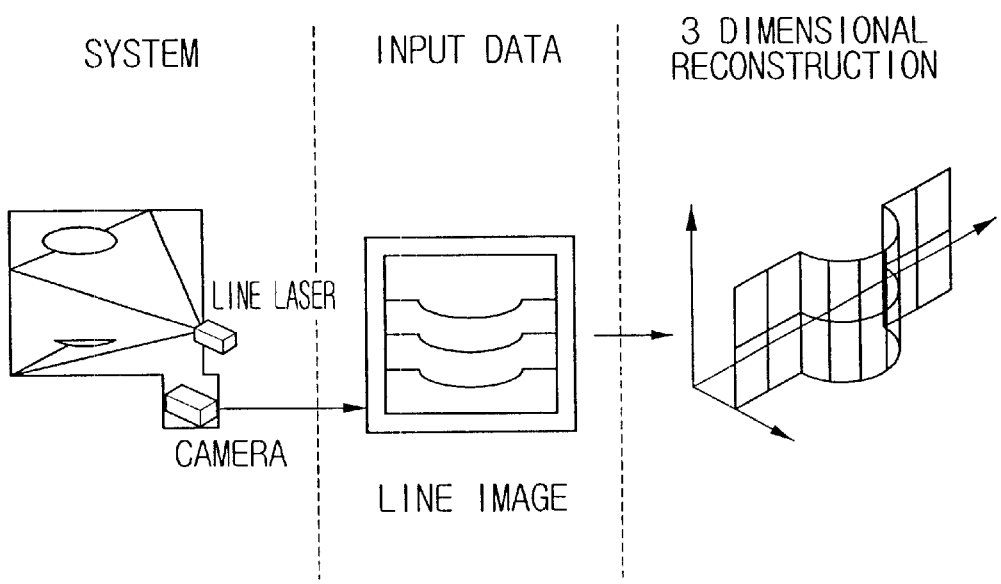
FIG. 9 is a view briefly showing a process of formulating a three-dimensional image with a plurality of linear images.
Figure 10:
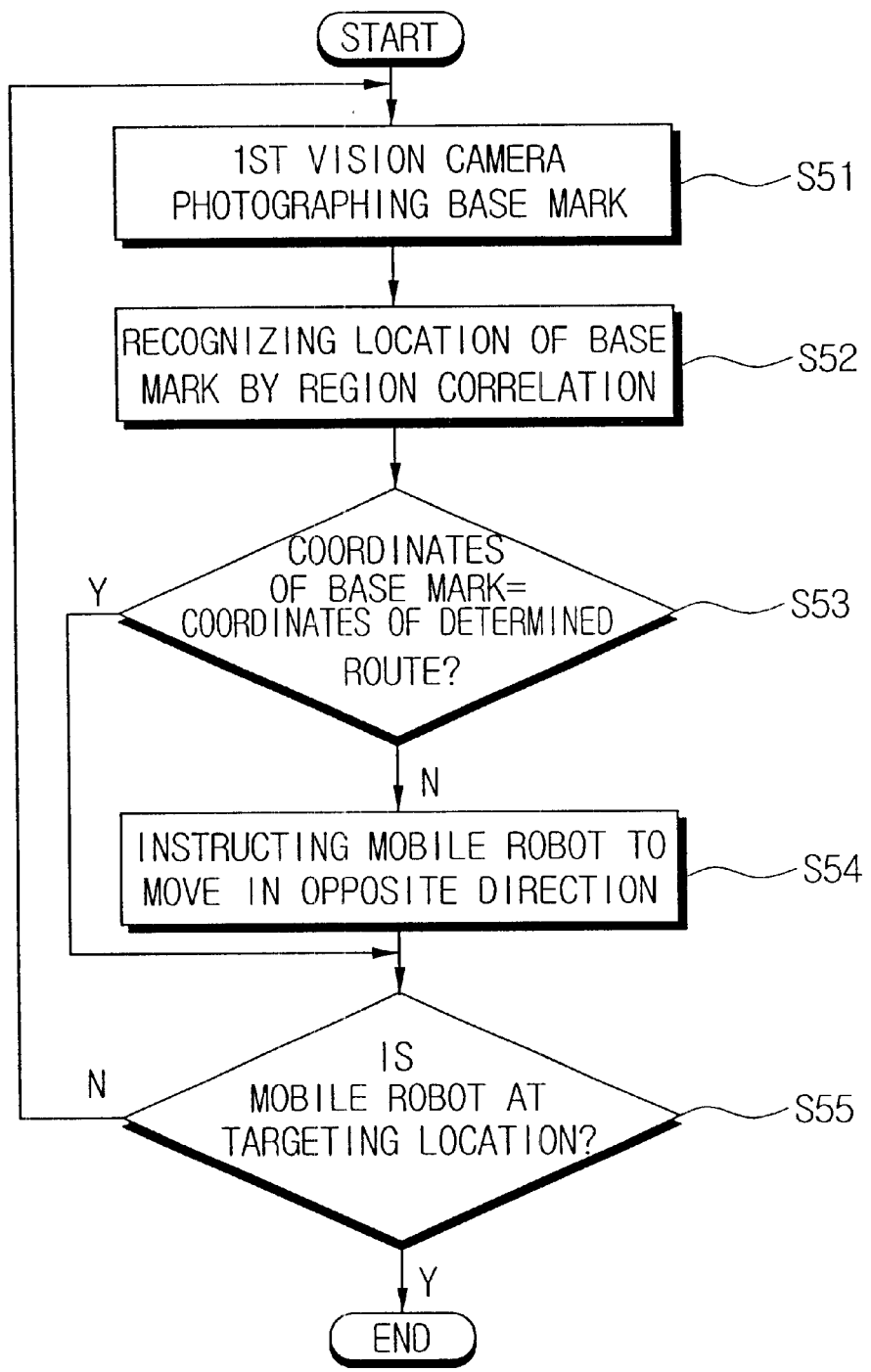
FIG. 10 is a flow chart explaining a method for adjusting an orientation of the mobile robot of the present invention.

According to another preferred embodiment of the present invention, a three-dimensional image can also be obtained by using a plurality of line lasers 41. A plurality of line lasers 41 are positioned to emit laser beams to the obstacle in an angle of incidence such that the linear beam incident on the obstacle can be recognized by the vision camera 43. The plurality of line lasers 41 emit the linear beams to the obstacle, and the vision camera 43 recognizes the reflective beams of the line lasers 41. Then by image processing the reflective beams, the three-dimensional image is obtained. FIG. 9 illustrates the processes of forming a three-dimensional image from a plurality of linear images. In this way, the mobile robot 1 obtains more accurate data about the obstacle, such as shape of the obstacle.

Finally, the process of reaching the targeting location while maintaining the right course will be described in greater detail below.

When the mobile robot 1 receives the start command, the controlling portion 10 initializes and requests the location recognizing device 20 and the obstacle detecting device 40 for image data. Upon receipt of the image data request from the controlling portion 10, the location recognizing device 20 photographs the ceiling to which the base mark 70 is attached and creates an image. Then the second vision board 23 processes the image into threshold and transmits the same to the controlling portion 10. The obstacle detecting device 40 uses the line laser 41 and the second vision camera 43 to generate image data about the obstacle located in the mobile robot's path and transmits the same to the controlling portion 10.

Software in the controlling portion 10 processes the image data received from the location recognizing device 20 and the obstacle detecting device 40 to obtain information about the obstacle and the current location of the mobile robot. The controlling portion 10 then sets the targeting location and route to the targeting location based on the information obtained above.

The controlling portion 10 transmits the run-command to the running device 30 along a determined route, periodically checks the coordinates of the base mark 70 at predetermined intervals, and determines whether or not the mobile robot 1 is moving along the determined route. If the coordinates of the base mark 70 deviate from the determined route, the controlling portion 10 controls the running device 30 to move the mobile robot 1 in an opposite direction, and thereby maintains the proper route of the mobile robot 1. After several route adjustments, and when the mobile robot 1 reaches the targeting location, the mobile robot 1 stops moving or keeps moving if there is a subsequent command.

The method of the controlling portion 10 for obtaining the current position of the mobile robot 1 is believed to correspond to the location recognizing process of the mobile robot 1, which has been described above. Accordingly, the detailed description thereof will be omitted.

Here, the process of checking the course and adjusting the direction of the mobile robot 1 when the mobile robot 1 deviates off course will be described in greater detail with reference to FIGS. 10, 11A, 11B, and 11C.

The controlling portion 10 requests the location recognizing device 20 for image data about the base mark 70. Upon receipt of the request from the controlling portion 10, the location recognizing device 20 photographs the ceiling to which the base mark 70 is attached, and generates an image of the base mark 70. Then, the first vision board 23 processes the image into image data that can be processed by software and transmits the image data to the controlling portion 10 (step S51).

The controlling portion 10 calculates the coordinates of the base mark 70 through the process of region correlation, which is identical with the process of obtaining location of the mobile robot 1 by using the image data transmitted from the location recognizing device 20 (step S52).

Next, the controlling portion 10 compares the coordinates of the base mark 70 obtained from the current location of the mobile robot 1 with the coordinates of the route determined in the route determining step (step S53).

Figure 11A:
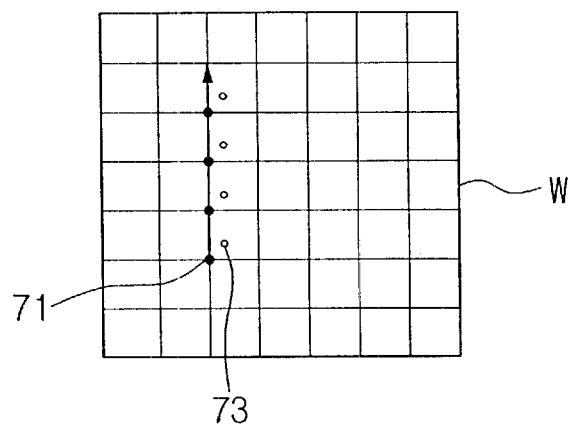
FIGS. 11A, 11B, and 11C are views showing lines formed by base marks, which are shown in an image window of a first vision camera according to the travel of the mobile robot.
Figure 11B:
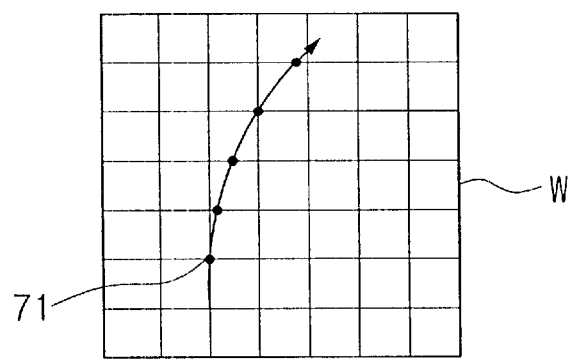
Figure 11C:
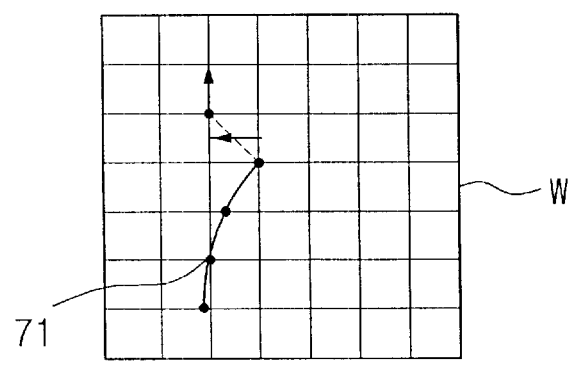

When the current coordinates of the base mark 70 do not agree with the coordinates of the determined course, the controlling portion 10 calculates the deviations in direction and distance from the determined coordinates of the course. The controlling portion 10 then controls the motor 32 of the running device 30 to move the mobile robot 1 to compensate for the deviations, by moving in the opposite direction to a deviated distance (step S54). For example, if the mobile robot 1 is off course to the right of the base mark 70, the controlling portion 10 controls the motor 32 to move the running device 30 to the left, i.e., back onto the course. Such processes are shown in FIGS. 11A, 11B, and 11C. FIG. 11A shows a locus of base marks 70 indicated on the image window (W) of the first vision camera 21 when the mobile robot 1 moves in a straight route. Likewise, FIG. 11B shows the locus of the base marks 70 on the image window (W) of the first vision camera 21 when the mobile robot 1 runs away from the straight route, while FIG. 11C shows the locus of the base marks 70 when the mobile robot 1 returns to the movement route. The reference numerals 71 and 73 in FIG. 11A refer to two recognition dots of the base mark 70.

Next, the controlling portion 10 determines whether the current location is the targeting location (step S55). If not, the controlling portion 10 requests the location recognizing device 20 for image data of the base mark 70 to determine whether the mobile robot 1 is at the same coordinates as the coordinates of the determined route.

The controlling portion 10 periodically repeats the above-mentioned processes at predetermined intervals until the mobile robot 1 reaches the targeting location, so as to keep the mobile robot 1 running on the determined course.

Figure 12:
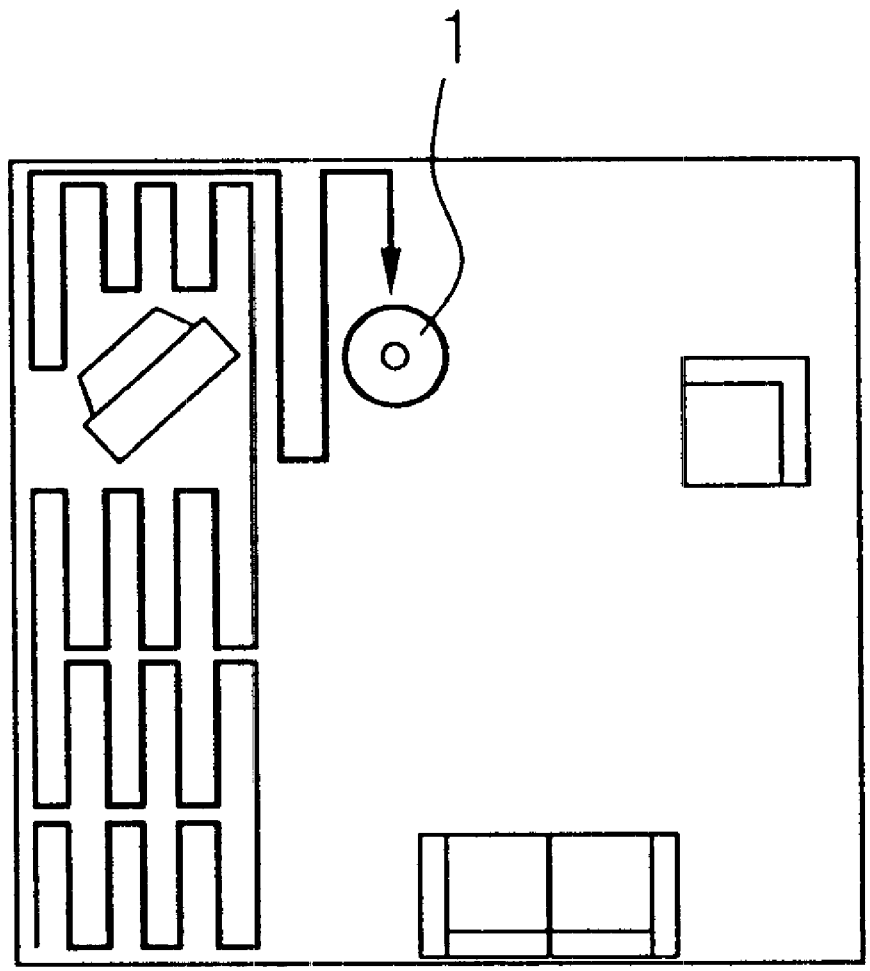
FIG. 12 is a view showing the mobile robot running along a certain course while recognizing its location.

FIG. 12 illustrates the movement of the mobile robot 1 that is capable of recognizing its location and maneuvering around objects in a room. Such a mobile robot 1 may be used as a home appliance, i.e., a vacuum cleaning mobile robot. Here, the mobile robot 1 further includes a vacuum cleaner which has a suction port for sucking in contaminants, dust collecting portion for collecting contaminants from the sucked air, and motor driving portion for generating suction force. The course or moving route of the vacuum cleaning mobile robot 1 can be pre-furnished in various patterns of programs according to the geography of the room.

As described above, the mobile robot 1 according to the present invention can recognize its current location, and also run on a given course efficiently without repetitiously running in the same area.

Further, according to the present invention, since the mobile robot 1 can obtain information about the shape of the obstacle by using the line laser 41 and the second vision camera 43, the mobile robot 1 can determine whether to pass or avoid the obstacle according to the status of the obstacle.

Further, the mobile robot 1 according to the present invention recognizes its location by using the first vision camera 21, determines whether or not to maintain the current moving route, and adjusts its orientation when it determines any deviation from the desired course.

As stated above, a preferred embodiment of the present invention is shown and described. Although the preferred embodiment of the present invention has been described, it is understood that the present invention should not be limited to this preferred embodiment. Various changes and modifications can be made by one skilled in the art within the spirit and scope of the present invention as hereinafter claimed.

What is claimed is:

1. A mobile robot comprising:

a running device for moving the mobile robot about a room;

an obstacle detecting device for detecting a presence of an obstacle;

a controlling portion coupled to and controlling the running device and the obstacle detecting device;

a location recognizing device coupled to the controlling portion for recognizing a current location of the mobile robot, the location recognizing device including a first vision camera and a first vision board, the first vision camera for imaging a ceiling of the room and recognizing a base mark on the ceiling, the first vision board processing an image from the first vision camera and transmitting data to the controlling portion; and a power supply coupled to the controlling portion, the power supply storing and supplying electricity to the running device, obstacle detecting device, location recognizing device, and the controlling portion, wherein the basemark is a recognition mark having a base plate, and a plurality of dots formed on the base plate at a predetermined distance from each other, and wherein the obstacle detecting device comprises:

a line laser for emitting a linear light beam toward the obstacle;

a first vision camera for recognizing a reflective linear light beam from the obstacle; and a first vision board for processing image data captured by the first vision camera.

2. A mobile robot comprising:

a running device for moving the mobile robot about a room;

a location recognizing device for recognizing a current location of the mobile robot;

a controlling portion for controlling the running device and the location recognizing device;

an obstacle detecting device coupled to the controlling portion for detecting a presence of an obstacle, the obstacle detecting device including a line laser for emitting a linear light beam toward the obstacle, a second vision camera for recognizing a reflective linear light beam from the obstacle, and a second vision board, the second vision board processing image data from the second vision camera;

a power supply coupled to the controlling portion, the power supply storing and supplying electricity to the running device, obstacle detecting device, location recognizing device, and the controlling portion.

3. The mobile robot as claimed in claim 2, wherein the second vision camera comprises a filter for exclusively recognizing the linear light beam from the line laser.

4. The mobile robot as claimed in claim 2, wherein the obstacle detecting device comprises a plurality of line lasers for emitting linear light beams at a predetermined angle.

5. The mobile robot as claimed in claim 2, further comprising a vacuum cleaner having:

a suction port for sucking in contaminants;

a dust collecting portion for collecting the contaminants therein; and a motor driving portion for generating a suction force.

6. A method for adjusting a course of a mobile robot, the mobile robot including a running device for moving the mobile robot about a room; an obstacle detecting device for detecting a presence of an obstacle; a location recognizing device for recognizing a current location of the mobile robot; a controlling portion for controlling the running device, the obstacle detecting device and the location recognizing device, and a power supply for storing and supplying electricity to the running device, the obstacle detecting device, the location recognizing device and the controlling portion, the method comprising:

(i) photographing a base mark using a first vision camera of the location recognizing device and generating image data of the base mark using a first vision board;

(ii) determining whether coordinates of the base mark, which are obtained by data processing of the controlling portion, match coordinates of a predetermined moving route; and (iii) controlling the running device of the mobile robot to move in a direction by a corresponding distance to compensate for any deviation from the predetermined moving route, when the coordinates of the base mark do not match the coordinates of the predetermined moving route.

7. The method as claimed in claim 6, wherein the step (i) includes:

photographing the base mark using the first vision camera of the location recognizing device and generating an image of the base mark; and setting a threshold of the image using the first vision board and generating image data.

8. The method as claimed in claim 6, wherein the step (ii) further includes performing region correlation in addition to calculating the coordinates of the base mark.

* * * * *